(12) United States Patent
Omer et al.

(10) Patent No.: US 9,743,294 B1
(45) Date of Patent: Aug. 22, 2017

(54) STORING MODEM PARAMETERS FOR MOTION DETECTION

(71) Applicant: Cognitive Systems Corp., Waterloo (CA)

(72) Inventors: Mohammad Omer, Waterloo (CA); Stephen Arnold Devison, Kitchener (CA); Yunfeng Piao, Kitchener (CA); Dustin Griesdorf, Waterloo (CA)

(73) Assignee: Cognitive Systems Corp., Waterloo, Ontario (CA)

( * ) Notice: Subject to any disclaimer, the term of this patent is extended or adjusted under 35 U.S.C. 154(b) by 0 days.

(21) Appl. No.: 15/460,643

(22) Filed: Mar. 16, 2017

(51) Int. Cl.
*G08B 1/08* (2006.01)
*H04W 24/02* (2009.01)
*H04L 29/06* (2006.01)
*H04W 84/18* (2009.01)

(52) U.S. Cl.
CPC ............. *H04W 24/02* (2013.01); *H04L 69/22* (2013.01); *H04W 84/18* (2013.01)

(58) Field of Classification Search
CPC ....... G01S 13/003; G01S 13/52; H04B 17/27; H04B 17/309; H04B 17/318; H04B 17/345; H04W 4/023; H04W 24/02; H04L 69/22
See application file for complete search history.

(56) References Cited

U.S. PATENT DOCUMENTS

| 4,054,879 A | 10/1977 | Wright et al. |
| 4,649,388 A | 3/1987 | Atlas |
| 4,740,045 A | 4/1988 | Goodson |
| 5,270,720 A | 12/1993 | Stove |
| 5,696,514 A | 12/1997 | Nathanson |
| 6,493,380 B1 | 12/2002 | Wu |
| 6,573,861 B1 | 6/2003 | Hommel et al. |
| 7,295,109 B2 | 11/2007 | Kobayashi |
| 7,652,617 B2 | 1/2010 | Kurtz et al. |

(Continued)

FOREIGN PATENT DOCUMENTS

| CA | 2834522 | 5/2014 |
| CA | 2945702 | 8/2015 |

(Continued)

OTHER PUBLICATIONS

Canadian Intellectual Property Office, International Search Report and Written Opinion issued in International Application No. PCT/CA2016/051466 on Mar. 14, 2017, 9 pages.

(Continued)

*Primary Examiner* — Omeed Alizada
(74) *Attorney, Agent, or Firm* — Henry Patent Law Firm PLLC

(57) ABSTRACT

In a general aspect, motion is detected by processing wireless signals using stored modem parameters. In some aspects, stored modem parameters are accessed from a memory of a wireless sensor device. The stored modem parameters represent a radio state previously used by a radio subsystem of the wireless sensor device in processing a first motion detection signal. The stored modem parameters are applied to the radio subsystem of the wireless sensor device, a second motion detection signal is processed at the wireless sensor device using the radio state represented by the stored modem parameters, and motion is detected based on the first and second motion detection signals.

20 Claims, 4 Drawing Sheets

(56) References Cited

U.S. PATENT DOCUMENTS

| | | | |
|---|---|---|---|
| 8,138,918 | B2 | 3/2012 | Habib |
| 8,836,344 | B2 | 9/2014 | Habib |
| 9,143,413 | B1 | 9/2015 | Manku |
| 9,143,968 | B1 | 9/2015 | Manku |
| 9,523,760 | B1 | 12/2016 | Kravets et al. |
| 9,524,628 | B1 | 12/2016 | Omer et al. |
| 9,584,974 | B1 | 2/2017 | Omer et al. |
| 2003/0108119 | A1 | 6/2003 | Mohebbi et al. |
| 2005/0055568 | A1 | 3/2005 | Agrawala |
| 2005/0083199 | A1 | 4/2005 | Hall |
| 2008/0119130 | A1 | 5/2008 | Sinha |
| 2008/0303655 | A1 | 12/2008 | Johnson |
| 2009/0062696 | A1 | 3/2009 | Nathan et al. |
| 2010/0315284 | A1 | 12/2010 | Trizna |
| 2011/0130092 | A1 | 6/2011 | Yun |
| 2012/0115512 | A1 | 5/2012 | Grainger et al. |
| 2012/0146788 | A1 | 6/2012 | Wilson |
| 2012/0184296 | A1 | 7/2012 | Milosiu |
| 2013/0090151 | A1* | 4/2013 | Ngai ............... H04W 52/0241 455/574 |
| 2013/0162459 | A1 | 6/2013 | Aharony et al. |
| 2013/0283256 | A1 | 10/2013 | Proud |
| 2014/0004874 | A1 | 1/2014 | Schwartz |
| 2014/0015706 | A1 | 1/2014 | Ishihara |
| 2014/0135042 | A1 | 5/2014 | Buchheim |
| 2014/0140231 | A1 | 5/2014 | Haiut |
| 2014/0247179 | A1 | 9/2014 | Furuskog |
| 2014/0286380 | A1 | 9/2014 | Prager et al. |
| 2015/0043377 | A1 | 2/2015 | Cholas |
| 2015/0078295 | A1 | 3/2015 | Mandyam et al. |
| 2015/0098377 | A1 | 4/2015 | Amini |
| 2015/0212205 | A1 | 7/2015 | Shpater |
| 2015/0245164 | A1 | 8/2015 | Merrill |
| 2015/0338507 | A1 | 11/2015 | Oh |
| 2016/0018508 | A1 | 1/2016 | Chen et al. |
| 2016/0187475 | A1 | 6/2016 | Horng et al. |
| 2016/0210838 | A1 | 7/2016 | Yan |
| 2016/0241999 | A1 | 8/2016 | Chin |

FOREIGN PATENT DOCUMENTS

| | | |
|---|---|---|
| WO | 2014021574 A1 | 2/2014 |
| WO | 2014201574 A1 | 12/2014 |
| WO | 2015/168700 A1 | 11/2015 |

OTHER PUBLICATIONS

Canadian Intellectual Property Office, International Search Report and Written Opinion for International Application No. PCT/CA2017/050037 issued on Apr. 13, 2017, 12 pages.

Canadian Intellectual Property Office, International Search Report and Written Opinion issued International Application No. PCT/CA2016/051228 on Apr. 25, 2017, 8 pages.

Netgear , "N600 Wifi Cable Modem Router, Model C3700 User Manual", https://web.archive.org/web/20150121182848/http://www.downloads.netgear.com/files/GDC/C3700_UM_21Aug2014.pdf (archive of URL http://www.downloads.netgear.com/files/GDC/C3700_UM_21Aug2014.pdf captured on Jan. 21, 2015, 101 pages.

OpenWrt , "Wireless Configuration", https://web.archive.org/web/20140402033233/http://wiki.openwrt.org/doc/uci/wireless (capture of URL http://wiki.openwrt.org/doc/uci/wireless on Apr. 2, 2014), 22 pages.

USPTO, Non-final Office Action issued in U.S. Appl. No. 15/461,125 on Apr. 19, 2017, 56 pages.

"Apple Insider; "Intel to reportedly supply LTD chips for 2016 iPhone"; http://appleinsider.com/articles/15/03/11/intel-to-reportedly-supply-ltd-chips-for-2016-iphone; 2 pages; May 15, 2016."

"Ceva; "Ceva's DSP Cores Power the World's Leading Mobile Broadband and M2M Applications"; http://www.ceva-dsp.com/Mobile-Broadband; 3 pages; May 15, 2016.".

"Japan Radio Co., Ltd; "26GHz FWA—Technology"; http://www.jrc.co.jp/eng/product/lineup/26ghz_wireless_ip_access_system/tech_html; 3 pages; May 15, 2016."

"quora.com; "What is the function of the baseband processor in wireless devices?"; https://ww.quora.com/What-is-the-function-of-the-baesband-processor-in-wireless-devices; 2 pages; May 15, 2016.".

"Wikipedia; "Baseband processor"; rhttps://en.wikipedia.org/wiki/Bandband_processor; 2 pages; version dated Apr. 20, 2016.".

* cited by examiner

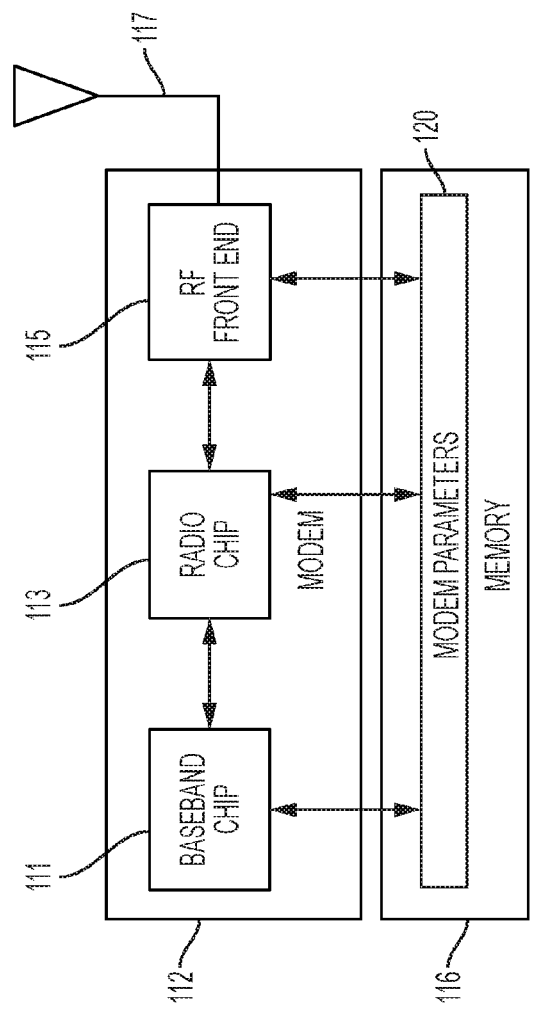
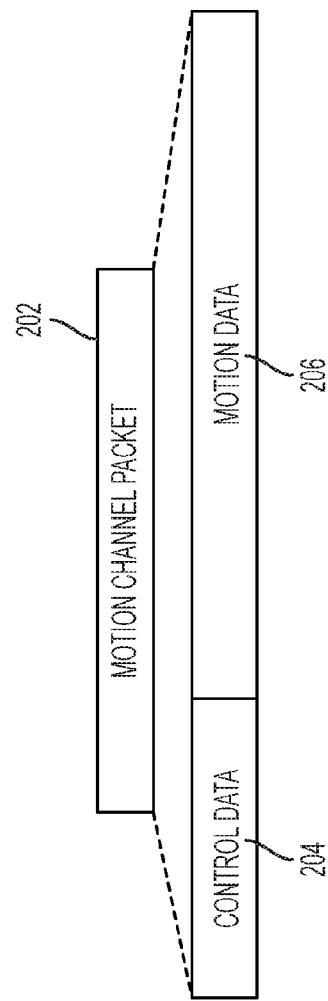

STORING MODEM PARAMETERS FOR MOTION DETECTION

BACKGROUND

The following description relates to motion detection.

Motion detection systems have been used to detect movement, for example, of objects in a room or an outdoor area. In some example motion detection systems, infrared or optical sensors are used to detect movement of objects in the sensor's field of view. Motion detection systems have been used in security systems, automated control systems and other types of systems.

DESCRIPTION OF DRAWINGS

FIG. 1B is a diagram showing an example modem of a motion detector device.

FIG. 2 is a diagram showing an example motion channel packet.

DETAILED DESCRIPTION

In some aspects of what is described here, motion is detected by processing wireless signals using stored modem parameters. For example, the modem parameters used to process a first set of motion detection signals may be stored in memory, and the same modem parameters may be used (e.g., by holding modem parameters constant) to process a second set of motion detection signals. The modem parameters may include parameters that indicate settings or an overall configuration for the operation of a radio subsystem or a baseband subsystem of the wireless sensor device (or both). For instance, the modem parameters may include one or more of a gain setting, an RF filter setting, an RF front end switch setting, a DC offset setting, or an IQ compensation setting for a radio subsystem, or a digital DC correction setting, a digital gain setting, or a digital filtering setting for a baseband subsystem.

In typical radio systems, modem parameters may be automatically changed to keep the signals received by the modem relatively constant over time. For example, a wireless device may automatically modify a gain or filter setting in response to seeing fluctuations in the magnitude or bandwidth of signals received by the modem. Varying modem parameters in this way for a wireless motion detector device can cause errors (e.g., false positives) in the detection of motion by the device, since the received motion detection signals will not be directly comparable with one another. By using the same parameters to process the motion detection signals, however, such errors may be avoided. For instance, different modem parameters applied to the radio or baseband subsystem of a wireless sensor device may cause inconsistencies between the data based on the received motion detection signals, making signals processed with different modem parameters incomparable for motion detection purposes. As an example, a different gain setting in a radio subsystem may cause a false positive reading by falsely indicating (because of the different gain setting) an increased magnitude of the signal.

Figure 1A:
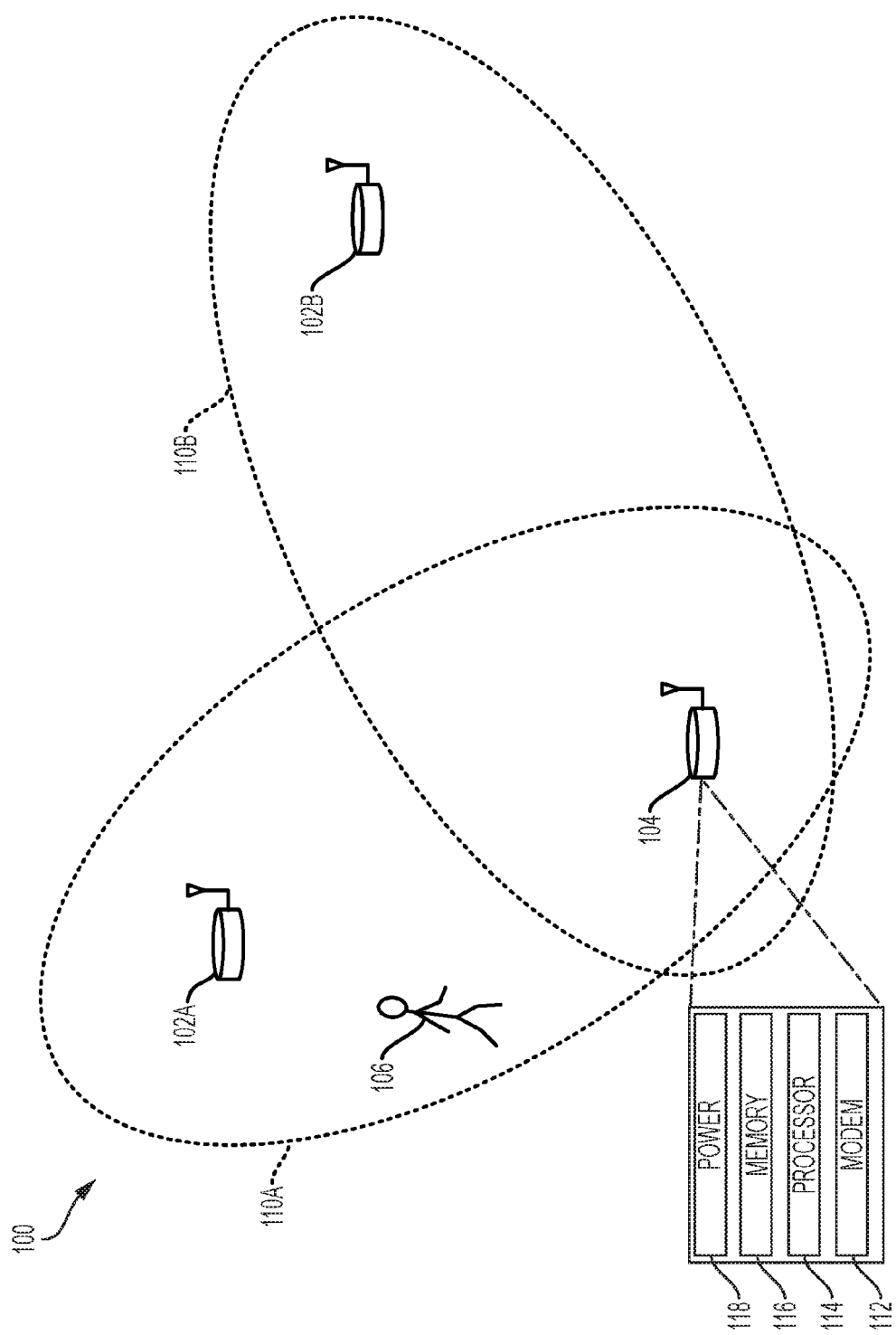
FIG. 1A is a diagram showing an example wireless communication system.

FIG. 1A is a diagram showing an example wireless communication system 100. The example wireless communication system 100 includes three wireless devices—a first wireless device 102A, a second wireless device 102B, and a motion detector device 104. The example wireless communication system 100 may include additional wireless devices and other components (e.g., additional motion detector devices, additional wireless devices, one or more network servers, network routers, network switches, cables, or other communication links, etc.).

The example wireless devices 102A, 102B can operate in a wireless network, for example, according to a wireless network standard or another type of wireless communication protocol. For example, the wireless network may be configured to operate as a Wireless Local Area Network (WLAN), a Personal Area Network (PAN), a metropolitan area network (MAN), or another type of wireless network. Examples of WLANs include networks configured to operate according to one or more of the 802.11 family of standards developed by IEEE (e.g., Wi-Fi networks), and others. Examples of PANs include networks that operate according to short-range communication standards (e.g., BLUETOOTH®, Near Field Communication (NFC), Zig-Bee), millimeter wave communications, and others.

In some implementations, the wireless devices 102A, 102B may be configured to communicate in a cellular network, for example, according to a cellular network standard. Examples of cellular networks include networks configured according to 2G standards such as Global System for Mobile (GSM) and Enhanced Data rates for GSM Evolution (EDGE) or EGPRS; 3G standards such as Code Division Multiple Access (CDMA), Wideband Code Division Multiple Access (WCDMA), Universal Mobile Telecommunications System (UMTS), and Time Division Synchronous Code Division Multiple Access (TD-SCDMA); 4G standards such as Long-Term Evolution (LTE) and LTE-Advanced (LTE-A); and others.

In the example shown in FIG. 1A, the wireless devices 102A, 102B can be, or they may include, standard wireless network components; for example, a conventional Wi-Fi access point or another type of wireless access point (WAP) may be used in some cases. In some cases, another type of standard or conventional Wi-Fi transmitter device may be used. In some examples, the wireless devices 102A, 102B each include a modem and other components such as, for example, a power unit, a memory, and wired communication ports. In some implementations, the first wireless device 102A and the second wireless device 102B are the same type of device. In some implementations, the first wireless device 102A and the second wireless device 102B are two different types of devices (e.g., wireless devices for two different types of wireless networks, or two different types of wireless devices for the same wireless network).

The example motion detector device 104 includes a modem 112, a processor 114, a memory 116, and a power unit 118. The motion detector device 104 may include additional or different components, and they may be configured to operate as shown in FIG. 1A or in another manner. In some implementations, the modem 112, processor 114, memory 116, and power unit 118 are housed together in a common housing or other assembly. In some implementations, one or more of the components can be housed separately, for example, in a separate housing or other assembly.

The example modem 112 can communicate (receive, transmit, or both) wireless signals. For example, the modem 112 may be configured to communicate radio frequency signals formatted according to a wireless communication standard. The modem 112 may be implemented as the example wireless network modem 112 shown in FIG. 1B, or may be implemented in another manner, for example, with other types of components or subsystems. In some implementations, the example modem 112 includes a radio subsystem and a baseband subsystem. In some cases, the baseband subsystem and radio subsystem can be implemented on a common chip or chipset, or they may be implemented in a card or another type of assembled device. The baseband subsystem can be coupled to the radio subsystem, for example, by leads, pins, wires, or other types of connections.

In some cases, a radio subsystem in the modem 112 can include one or more antennas and radio frequency circuitry. The radio frequency circuitry can include, for example, circuitry that filters, amplifies or otherwise conditions analog signals, circuitry that up-converts baseband signals to RF signals, circuitry that down-converts RF signals to baseband signals, etc. Such circuitry may include, for example, filters, amplifiers, mixers, a local oscillator, etc. The radio subsystem can be configured to communicate radio frequency wireless signals on the wireless communication channels. As an example, the radio subsystem may include the radio chip 113, the RF front end 115, and antenna 117 shown in FIG. 1B. A radio subsystem may include additional or different components. In some implementations, the radio subsystem can be or include the radio electronics (e.g., RF front end, radio chip, or analogous components) from a conventional modem, for example, from a Wi-Fi modem, pico base station modem, etc. In some implementations, the antenna 117 includes multiple antennas.

In some cases, a baseband subsystem in the modem 112 can include, for example, digital electronics configured to process digital baseband data. As an example, the baseband subsystem may include the baseband chip 111 shown in FIG. 1B. A baseband subsystem may include additional or different components. In some cases, the baseband subsystem may include a digital signal processor (DSP) device or another type of processor device. In some cases, the baseband system includes digital processing logic to operate the radio subsystem, to communicate wireless network traffic through the radio subsystem, to detect motion based on motion detection signals received through the radio subsystem or to perform other types of processes. For instance, the baseband subsystem may include one or more chips, chipsets, or other types of devices that are configured to encode signals and deliver the encoded signals to the radio subsystem for transmission, or to identify and analyze data encoded in signals from the radio subsystem (e.g., by decoding the signals according to a wireless communication standard, by processing the signals according to a motion detection process, or otherwise).

In some instances, the radio subsystem in the example modem 112 receives baseband signals from the baseband subsystem, up-converts the baseband signals to radio frequency signals, and wirelessly transmits the radio frequency signals (e.g., through an antenna). In some instances, the radio subsystem in the example modem 112 wirelessly receives radio frequency signals (e.g., through an antenna), down-converts the radio frequency signals to baseband signals, and sends the baseband signals to the baseband subsystem. The signals exchanged between the radio subsystem and the baseband subsystem may be digital or analog signals. In some examples, the baseband subsystem includes conversion circuitry (e.g., a digital-to-analog converter, an analog-to-digital converter) and exchanges analog signals with the radio subsystem. In some examples, the radio subsystem includes conversion circuitry (e.g., a digital-to-analog converter, an analog-to-digital converter) and exchanges digital signals with the baseband subsystem.

In some cases, the baseband subsystem of the example modem 112 can communicate wireless network traffic (e.g., data packets) in the wireless communication network through the radio subsystem on one or more network traffic channels. The baseband subsystem of the modem 112 may also transmit or receive (or both) motion detection signals (e.g., motion detection packets) through the radio subsystem on a motion detection channel. In some instances, the baseband subsystem generates the motion detection signals for transmission, for example, in order to probe a space for motion. In some instances, the baseband subsystem processes received motion detection signals, for example, to detect motion of an object in a space.

The example processor 114 can execute instructions, for example, to generate output data based on data inputs. The instructions can include programs, codes, scripts, or other types of data stored in memory. Additionally or alternatively, the instructions can be encoded as pre-programmed or re-programmable logic circuits, logic gates, or other types of hardware or firmware components. The processor 114 may be or include a general purpose microprocessor, as a specialized co-processor or another type of data processing apparatus. In some cases, the processor 114 performs high level operation of the motion detector device 104. For example, the processor 114 may be configured to execute or interpret software, scripts, programs, functions, executables, or other modules stored in the memory 116. In some implementations, the processor 114 may be included in the modem 112.

The example memory 116 can include computer-readable media, for example, a volatile memory device, a non-volatile memory device, or both. The memory 116 can include one or more read-only memory devices, random-access memory devices, buffer memory devices, or a combination of these and other types of memory devices. In some instances, one or more components of the memory can be integrated or otherwise associated with another component of the motion detector device 104.

The example power unit 118 provides power to the other components of the motion detector device 104. For example, the other components may operate based on electrical power provided by the power unit 118 through a voltage bus or other connection. In some implementations, the power unit 118 includes a battery or a battery system, for example, a rechargeable battery. In some implementations, the power unit 118 includes an adapter (e.g., and AC adapter) that receives an external power signal (from an external source) and coverts the external power signal to an internal power signal conditioned for a component of the motion detector device 104. The power unit 118 may include other components or operate in another manner.

In the example shown in FIG. 1A, the wireless devices 102A, 102B transmit wireless signals according to a wireless network standard. For instance, wireless devices 102A, 102B may broadcast wireless signals (e.g., beacon signals, status signals, etc.), or they may send wireless signals addressed to other devices (e.g., a user equipment, a client device, a server, etc.), and the other devices (not shown) as well as the motion detector device 104 may receive the wireless signals transmitted by the wireless devices 102A, 102B. In some cases, the wireless signals transmitted by the wireless devices 102A, 102B are repeated periodically, for example, according to a wireless communication standard or otherwise.

In the example shown, the motion detector device 104 processes the wireless signals from the wireless devices 102A, 102B using stored modem parameters to detect motion occurring in a space accessed by the wireless signals. For example, the motion detector device 104 may perform the example process 400 of FIG. 4, or another type of process for detecting motion. The space accessed by the motion detection signals can be an indoor or outdoor space, which may include, for example, one or more fully or partially enclosed areas, an open area without enclosure, etc. The space can be or can include an interior of a room, multiple rooms, a building, or the like. In some cases, the wireless communication system 100 can be modified, for instance, such that the motion detector device 104 can transmit wireless signals and the wireless devices 102A, 102B can processes the wireless signals from the motion detector device 104 to detect motion.

The wireless signals used for motion detection can include, for example, a beacon signal (e.g., Bluetooth Beacons, Wi-Fi Beacons, other wireless beacon signals) or another standard signal generated for other purposes according to a wireless network standard. In some examples, the wireless signals propagate through an object (e.g., a wall) before or after interacting with a moving object, which may allow the moving object's movement to be detected without an optical line-of-sight between the moving object and the transmission or receiving hardware. The motion detection data generated by the motion detector device 104 may be communicated to another device or system, such as a security system, that may include a control center for monitoring movement within a space, such as a room, building, outdoor area, etc.

In some implementations, the wireless devices 102A, 102B can be modified to include a separate transmission channel (e.g., a frequency channel or coded channel) that transmits signals with a header and a payload that the motion detector device 104 can use for motion sensing. For example, the modulation applied to the payload and the type of data or data structure in the payload may be known by the motion detector device 104, which may reduce the amount of processing that the motion detector device 104 performs for motion sensing. The header may include additional information such as, for example, an indication of whether motion was detected by another device in the communication system 100, an indication of the modulation type, etc.

In the example shown in FIG. 1A, the wireless communication link between the motion detector device 104 and the first wireless device 102A can be used to probe a first motion detection field 110A, and the wireless communication link between the motion detector device 104 and the second wireless device 102A can be used to probe a second motion detection field 110B. In some instances, the motion detector device 104 detects motion in the motion detection fields 110A, 110B by processing received signals that are based on signals transmitted by the wireless devices 102A, 102B, respectively to the motion detector device 104. For example, when the person 106 shown in FIG. 1A moves in the first motion detection field 110A, the motion detector device 104 may detect the motion based on the wireless signals transmitted by the first wireless device 102A.

In some instances, the motion detection fields 110A, 110B can include, for example, air, solid materials, liquids, or another medium through which wireless electromagnetic signals may propagate. In the example shown in FIG. 1A, the first motion detection field 110A provides a wireless communication channel between the first wireless device 102A and the motion detector device 104, and the second motion detection field 110B provides a wireless communication channel between the second wireless device 102B and the motion detector device 104. In some aspects of operation, wireless signals transferred through a wireless communication channel are used to detect movement of an object in the wireless communication channel. The objects can be any type of static or moveable object, and can be living or inanimate. For example, the object can be a human (e.g., the person 106 shown in FIG. 1A), an animal, an inorganic object, or another device, apparatus, or assembly), an object that defines all or part of the boundary of a space (e.g., a wall, door, window, etc.), or another type of object.

FIG. 1B is a diagram showing an example wireless network modem 112 coupled to a memory 112 storing radio states 120. In some examples, the wireless network modem 112 can be implemented as a card, a chip, a chipset, or another type of device. A modem may generally include a radio subsystem and a baseband subsystem, along with software or firmware for one or more wireless communication standards or other protocols. In some cases, a modem includes hardware, software, or firmware (or combinations thereof) to support multiple wireless communication standards (e.g., 3G and LTE).

The example wireless network modem 112 shown in FIG. 1B may be operated as described above. For example, the wireless network modem 112 may communicate on the wireless communication channels (e.g., network traffic channels and a motion detection channel), and detect motion of object, for example, by processing motion detection signals. In some instances, the example wireless network modem 112 may operate in another manner.

The example wireless network modem 112 shown in FIG. 1B includes a baseband chip 111, a radio chip 113 and a radio frequency (RF) front end 115. The wireless network modem 112 may include additional or different features, and the components may be arranged as shown or in another manner. In some implementations, the baseband chip 111 includes the components and performs the operations of the baseband subsystem described with respect to the example modem 112 shown in FIG. 1A. In some implementations, the baseband chip 111 can process in-phase and quadrature signals (I and Q signals) from the radio chip 113 to extract data from received wireless signals. The baseband chip 111 may control the radio chip 113 or perform other operations. In some cases, the baseband chip 111 can be implemented as a digital signal processor (DSP) or another type of data processing apparatus.

In some implementations, the radio chip 113 and the RF front end 115 include the components and perform the operations of the radio subsystem described with respect to the example modem 112 shown in FIG. 1A. In some implementations, the radio chip 113 can produce in-phase and quadrature signals (I and Q signals), for example, in digital or analog format, based on received wireless signals. In some implementations, the RF front end 115 can include one or more filters, RF switches, couplers, RF gain chips or other components that condition radio frequency signals for transmission or processing.

In some instances, the modem 112 processes motion detection signals. Processing the motion detection signals may include receiving the motion detection signals at the antenna 117, conditioning (e.g., filtering, amplifying, or down-converting) the motion detection signals at the radio chip 113 or the RF front end 115, and digitally processing the motion detection signals at the baseband chip 111. The modem 112 may utilize one or more modem parameters that indicate one or more settings of the baseband chip 111, the radio chip 113, or the RF front end 115. For instance, the modem parameters may include one or more of a gain setting, an RF filter setting, an RF front end switch setting, a DC offset setting, an IQ compensation setting or another setting for the radio chip 113 or the RF front end 115, or a digital DC correction setting, a digital gain setting, a digital filtering setting or another setting for the baseband chip 111.

In the radio subsystem of the example modem 112 shown in FIG. 1B, the gain setting controls an amount of gain provided at the RF front end 115 to an RF signal received by the antenna 117 (e.g., using an Automatic Gain Control loop); the RF filter setting controls a bandwidth filter in the RF front end 115 (e.g., based upon the expected bandwidth of the signal to be received at the antenna 117); the RF front end switch setting controls which RF filters or antenna switches are activated in the RF front end 115 (e.g., to select a particular signal from one of many antennas); the DC offset setting controls an amount of DC signal correction applied in the radio chip 113 (e.g., using a DC offset loop) to a baseband signal; and the IQ compensation setting controls an amount of IQ phase correction applied to signals by the radio chip 113. In the baseband subsystem of the example modem 112 shown in FIG. 1B, the digital DC correction setting controls an amount of DC signal correction applied to a digital signal in the baseband chip 111; the digital gain setting controls an amount of gain applied to a digital signal in the baseband chip 111; and the digital filter setting controls which filter or filters are applied to a digital signal in the baseband chip 111.

For example, if a received signal has a relatively weak magnitude, the gain setting may increase an amount of gain applied to the received signal (before processing by the radio chip 113), and may decrease an amount of gain applied to a received signal with a relatively strong magnitude. As another example, if an expected signal has a relatively wide bandwidth of approximately 40 MHz, the RF filter setting may set an RF filter in the RF front end 115 to allow a 40 MHz signal to pass from the antenna 117 to the radio chip 113. As another example, if there is an DC signal (a signal having ω=0 and positive or negative magnitude) present in a down-converted baseband signal, the DC offset setting may allow for a DC correction signal to be applied to the down-converted baseband signal in the radio chip 113 to remove the DC signal. As another example, where in-phase and quadrature signals (I and Q signals) do not have 90 degree phase difference (e.g., a 93 degree difference), an IQ correction signal may be applied to the signals to arrive at the desired 90 degree phase difference.

In some implementations, the modem parameters used to process a first set of motion detection signals may be used (e.g., by being held constant) to process a second set of motion detection signals. By using the same parameters to process the first and second set of motion detection signals, errors (e.g., false positives) in detecting motion may be avoided. For example, by changing the gain setting in the RF front end 115 when processing motion detection signals, an increased magnitude may be determined and motion may be falsely detected.

FIG. 2 is a diagram showing an example motion channel packet 202. The example motion channel packet 202 can be transmitted, for example, in a wireless communication system in order to monitor for motion in a space. In some examples, the motion channel packet 202 is transmitted in the form of a motion detection signal on a motion detection channel in a wireless communication network. For instance, the motion channel packet 202 can include binary data that is converted to an analog signal, up-converted to radio frequency, and wirelessly transmitted by an antenna.

The example motion channel packet 202 shown in FIG. 2 includes control data 204 and a motion data 206. A motion channel packet 202 may include additional or different features, and may be formatted in another manner. In the example shown, the control data 204 may include the type of control data that would be included in a conventional data packet. For instance, the control data 204 may include a preamble indicating the type of information contained in the motion channel packet 202, an identifier of a wireless device transmitting the motion channel packet 202, a MAC address of a wireless device transmitting the motion channel packet 202, a transmission power, etc. The motion data 206 is the payload of the example motion channel packet 202. In some implementations, the motion data 206 can be or include, for example, a pseudorandom code or another type of reference signal. In some implementations, the motion data 206 can be or include, for example, a beacon signal broadcast by a wireless network system.

In an example, the motion channel packet 202 is transmitted by a wireless device (e.g., the wireless device 102A shown in FIG. 1A) and received at a motion detection device (e.g., the motion detector device 104 shown in FIG. 1A). In some cases, the control data 204 changes with each transmission, for example, to indicate the time of transmission or updated parameters. The motion data 206 can remain unchanged in each transmission of the motion channel packet 202. The motion detection device can process the received signals based on each transmission of the motion channel packet 202, and analyze the motion data 206 for changes. For instance, changes in the motion data 206 may indicate movement of an object in a space accessed by the wireless transmission of the motion channel packet 202. The motion data 206 can then be processed, for example, to generate a response to the detected motion.

Figure 3A:
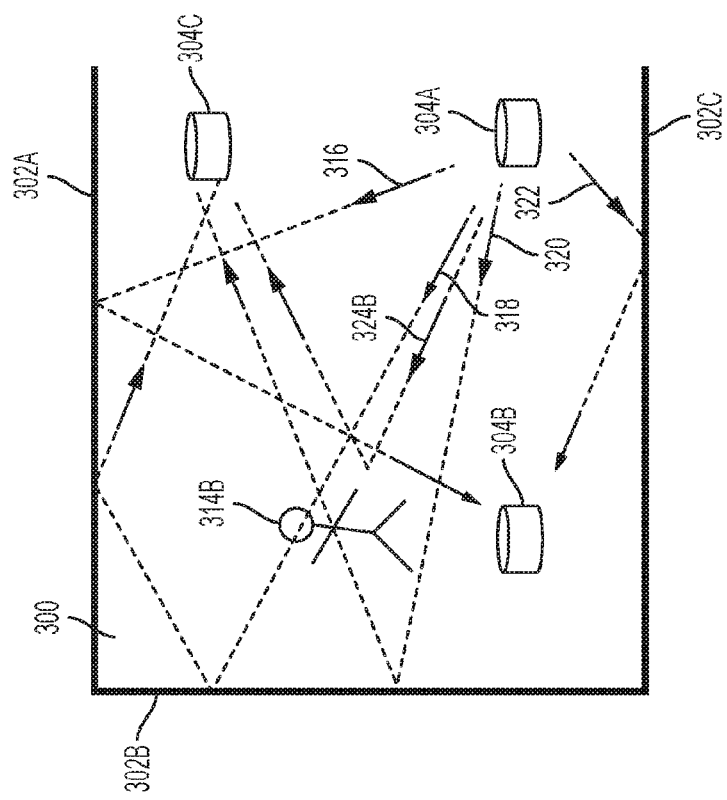
FIGS. 3A and 3B are diagrams showing example signals communicated between wireless sensor devices.
Figure 3B:
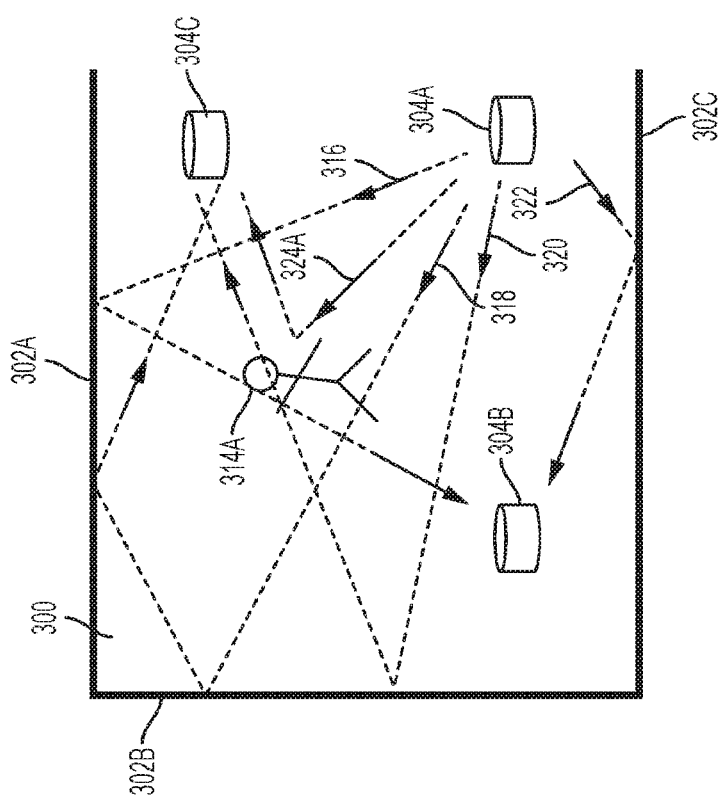

FIGS. 3A and 3B are diagrams showing example motion detection signals communicated between wireless sensor devices 304A, 304B, 304C. The wireless sensor devices 304A, 304B, 304C can be, for example, the wireless devices 102A, 102B and motion detector device 104 shown in FIG. 1A, or other types of wireless sensor devices. The example wireless sensor devices 304A, 304B, 304C transmit wireless signals in a space 300. The example space 300 can be completely or partially enclosed or open at one or more boundaries of the space. The space 300 can be or can include an interior of a room, multiple rooms, a building, an indoor area, outdoor area, or the like. A first wall 302A, a second wall 302B, and a third wall 302C at least partially enclose the space 300 in the example shown.

In the example shown in FIGS. 3A and 3B, the first wireless sensor device 304A is operable to transmit motion detection signals repeatedly (e.g., periodically, intermittently, at random intervals, etc.). The second and third wireless sensor devices 304B, 304C are operable to receive the transmitted motion detection signals. The wireless sensor devices 304B, 304C each have a modem (e.g., the modem 112 shown in FIG. 1B) that is configured to process motion detection signals using stored modem parameters, for example, according to process 400 of FIG. 4.

As shown, an object is in a first position 314A in FIG. 3A, and the object has moved to a second position 314B in FIG. 3B. In FIGS. 3A and 3B, the moving object in the space 300 is represented as a human, but the moving object can be another type of object. For example, the moving object can be an animal, an inorganic object (e.g., a system, device, apparatus, or assembly), an object that defines all or part of the boundary of the space 300 (e.g., a wall, door, window, etc.), or another type of object.

As shown in FIGS. 3A and 3B, multiple example paths of the motion detection signal transmitted from the first wireless sensor device 304A are illustrated by dashed lines. Along a first signal path 316, the motion detection signal is transmitted from the first wireless sensor device 304A and reflected off the first wall 302A toward the second wireless sensor device 304B. Along a second signal path 318, the motion detection signal is transmitted from the first wireless sensor device 304A and reflected off the second wall 302B and the first wall 302A toward the third wireless sensor device 304C. Along a third signal path 320, the motion detection signal is transmitted from the first wireless sensor device 304A and reflected off the second wall 302B toward the third wireless sensor device 304C. Along a fourth signal path 322, the motion detection signal is transmitted from the first wireless sensor device 304A and reflected off the third wall 302C toward the second wireless sensor device 304B.

In FIG. 3A, along a fifth signal path 324A, the motion detection signal is transmitted from the first wireless sensor device 304A and reflected off the object at the first position 314A toward the third wireless sensor device 304C. Between FIGS. 3A and 3B, a surface of the object moves from the first position 314A to a second position 314B in the space 300 (e.g., some distance away from the first position 314A). In FIG. 3B, along a sixth signal path 324B, the motion detection signal is transmitted from the first wireless sensor device 304A and reflected off the object at the second position 314B toward the third wireless sensor device 304C. The sixth signal path 324B depicted in FIG. 3B is longer than the fifth signal path 324A depicted in FIG. 3A due to the movement of the object from the first position 314A to the second position 314B. In some examples, a signal path can be added, removed, or otherwise modified due to movement of an object in a space.

The example motion detection signals shown in FIGS. 3A and 3B may experience attenuation, frequency shifts, phase shifts, or other effects through their respective paths and may have portions that propagate in another direction, for example, through the walls 302A, 302B, and 302C. In some examples, the motion detection signals are radio frequency (RF) signals; or the motion detection signals may include other types of signals.

In the example shown in FIGS. 3A and 3B, the first wireless sensor device 304A can repeatedly transmit a motion detection signal. In particular, FIG. 3A shows the motion detection signal being transmitted from the first wireless sensor device 304A at a first time, and FIG. 3B shows the same signal being transmitted from the first wireless sensor device 304A at a second, later time. The transmitted signal can be transmitted continuously, periodically, at random or intermittent times or the like, or a combination thereof. The transmitted signal can have a number of frequency components in a frequency bandwidth. The transmitted signal can be transmitted from the first wireless sensor device 304A in an omnidirectional manner, in a directional manner or otherwise. In the example shown, the motion detection signals traverse multiple respective paths in the space 300, and the signal along each path may become attenuated due to path losses, scattering, reflection, or the like and may have a phase or frequency offset.

As shown in FIGS. 3A and 3B, the signals from various paths 316, 318, 320, 322, 324A, and 324B combine at the third wireless sensor device 304C and the second wireless sensor device 304B to form received signals. Because of the effects of the multiple paths in the space 300 on the transmitted signal, the space 300 may be represented as a transfer function (e.g., a filter) in which the transmitted signal is input and the received signal is output. When an object moves in the space 300, the attenuation or phase offset affected upon a signal in a signal path can change, and hence, the transfer function of the space 300 can change. Assuming the same motion detection signal is transmitted from the first wireless sensor device 304A, if the transfer function of the space 300 changes, the output of that transfer function—the received signal—will also change. A change in the received signal can be used to detect movement of an object.

Mathematically, a transmitted signal f(t) transmitted from the first wireless sensor device 304A may be described according to Equation (1):

$$f(t) = \sum_{n=-\infty}^{\infty} c_n e^{j\omega_n t} \quad (1)$$

where $\omega_n$ represents the frequency of $n^{th}$ frequency component of the transmitted signal, $c_n$ represents the complex coefficient of the $n^{th}$ frequency component, and t represents time. With the transmitted signal f(t) being transmitted from the first wireless sensor device 304A, an output signal $r_k(t)$ from a path k may be described according to Equation (2):

$$r_k(t) = \sum_{n=-\infty}^{\infty} \alpha_{n,k} c_n e^{j(\omega_n t + \phi_{n,k})} \quad (2)$$

where $\alpha_{n,k}$ represents an attenuation factor (e.g., due to scattering, reflection, and path losses) for the $n^{th}$ frequency component along path k, and $\phi_{n,k}$ represents the phase of the signal for $n^{th}$ frequency component along path k. Then, the received signal R at a wireless sensor device can be described as the summation of all output signals $r_k(t)$ from all paths to the wireless sensor device, which is shown in Equation (3):

$$R = \sum_k r_k(t) \quad (3)$$

Substituting Equation (2) into Equation (3) renders the following Equation (4):

$$R = \sum_k \sum_{n=-\infty}^{\infty} (\alpha_{n,k} e^{j\phi_{n,k}}) c_n e^{j\omega_n t} \quad (4)$$

The received signal R at a wireless sensor device can then be analyzed. The received signal R at a wireless sensor device can be transformed to the frequency domain, for example, using a Fast Fourier Transform (FFT) or another type of algorithm. The transformed signal can represent the received signal R as a series of n complex values, one for each of the respective frequency components (at then frequencies $\omega_n$). For a frequency component at frequency $\omega_n$, a complex value $Y_n$ may be represented as follows in Equation (5):

$$Y_n = \sum_k c_n \alpha_{n,k} e^{j\phi_{n,k}}. \quad (5)$$

The complex value $Y_n$ for a given frequency component $\omega_n$ indicates a relative magnitude and phase offset of the received signal at that frequency component $\omega_n$. In some implementations, the complex value $Y_n$ represents a frequency component of a frequency response signal based on the signals received by a wireless sensor device.

With the first wireless sensor device 304A repeatedly (e.g., at least twice) transmitting the transmitted signal f(t) and a respective wireless sensor device 304B, 304C receiving and analyzing a respective received signal R, the respective wireless sensor device 304B, 304C can determine when a change in a complex value $Y_n$ (e.g., a magnitude or phase) for a given frequency component $\omega_n$ occurs that is indicative of movement of an object within the space 300. For example, a change in a complex value $Y_n$ for a given frequency component $\omega_n$ may exceed a predefined threshold to indicate movement. In some examples, small changes in one or more complex values $Y_n$ may not be statistically significant, but may only be indicative of noise or other effects.

In some examples, transmitted and received signals are in an RF spectrum, and signals are analyzed in a baseband bandwidth. For example, a transmitted signal may include a baseband signal that has been up-converted to define a transmitted RF signal, and a received signal may include a received RF signal that has been down-converted to a baseband signal. Because the received baseband signal is embedded in the received RF signal, effects of movement in the space (e.g., a change in a transfer function) may occur on the received baseband signal, and the baseband signal may be the signal that is processed (e.g., using a Fourier analysis or another type of analysis) to detect movement. In other examples, the processed signal may be an RF signal or another signal.

In some implementations, statistical parameters may be determined for frequency response signals based on wireless signals received by wireless sensor devices (e.g., wireless devices 102A, 102B or motion detector device 104 of FIG. 1A). The statistical parameter may describe a characteristic of the frequency response signals, and may be based on a function applied to frequency components of the frequency response signals over a time segment. In some instances, the statistical parameter includes at least one of the maximum, minimum, mean, or standard deviation of one or more frequency components of the frequency response signals.

Figure 4:
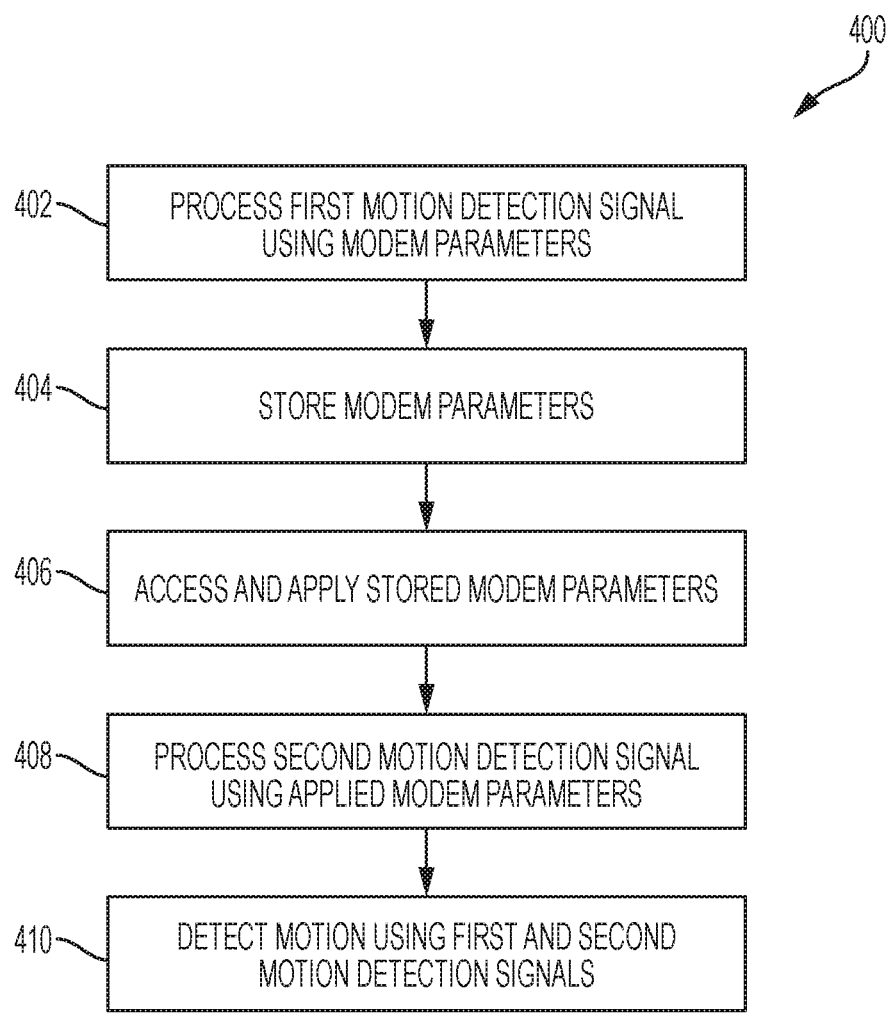
FIG. 4 is a flow diagram showing an example process for detecting motion by processing wireless signals using stored modem parameters.

FIG. 4 is a flow diagram showing an example process 400 for detecting motion by processing wireless signals using stored modem parameters. For instance, operations in the example process 400 may be performed by the processor 114 of the example motion detector device 104 in FIG. 1A to detect motion based on motion detection signals received from wireless devices 102A, 102B. The example process 400 may be performed by another type of device. For instance, the example process 400 may be performed by a system other than the motion detector device 104 that is communicatively coupled to the motion detector device (e.g., a computer system connected to the wireless communication system 100 of FIG. 1A that aggregates and analyzes motion detection signals received by the motion detector device 104). The example process 400 may include additional or different operations, and the operations may be performed in the order shown or in another order. In some cases, one or more of the operations shown in FIG. 4 are implemented as processes that include multiple operations, sub-processes or other types of routines. In some cases, operations can be combined, performed in another order, performed in parallel, iterated, or otherwise repeated or performed another manner.

At 402, a first motion detection signal is processed by a wireless sensor device (e.g., the motion detector device 104 of FIG. 1A) using a set of modem parameters. The first motion detection signal may be based on a wireless signal transmitted through a space by a wireless device. Referring to the example shown in FIG. 1A, the motion detection signal may be a wireless signal transmitted by one (or both) of wireless device 102A or 102B. In some implementations, the wireless sensor device receiving the first motion detection signal may be the same device that initially transmitted the wireless signal through the space (the signal upon which the first motion detection signal is based). In some implementations, the first motion detection signal includes motion channel packets (e.g., similar to the motion channel packet 202 of FIG. 2).

The modem parameters may include settings for one or more components of a modem of the wireless sensor device, such as a radio subsystem or a baseband subsystem of the modem. In some implementations, for example, the modem parameters represent a radio state of a radio subsystem of the wireless sensor device. Referring to the example modem 112 of FIG. 1B, for instance, the modem parameters may represent settings or an overall configuration of the radio chip 113 or the RF front end 115. In some implementations, the modem parameters include one or more of a gain setting, an RF filter setting, an RF front end switch setting, a DC offset setting, or an IQ compensation setting. As another example, in some implementations, the modem parameters represent a baseband processing state of a baseband subsystem of the wireless sensor device. Referring to the example modem 112 of FIG. 1B, for instance, the modem parameters may represent settings or an overall configuration of the baseband chip 111. In some implementations, the modem parameters include one or more of a digital DC correction setting, a digital gain setting, or a digital filtering setting.

Processing the first motion detection signal may include receiving the first motion detection signal at an antenna of the wireless sensor device (e.g., the antenna 117 of FIG. 1B), conditioning (e.g., filtering, amplifying, or down-converting) the first motion detection signal at a radio subsystem of the wireless sensor device (e.g., the radio chip 113 or the RF front end 115 of FIG. 1B), and digitally processing the first motion detection signal at a baseband subsystem of the wireless sensor device (e.g., the baseband chip 111 of FIG. 1B or another DSP chip).

At 404, the modem parameters used to process the first motion detection signal at 402 are stored in a memory. In some implementations, the modem parameters are stored in response to receiving the first motion detection signal. For example, the first motion detection signal may include a packet that includes a header and a payload (e.g., similar to the control data 204 and the motion data 206 of the motion channel packet 202 of FIG. 2), and the modem parameters may be stored after reading the header and accordingly determining that the first motion detection signal has been received at the wireless sensor device. In some implementations, the modem parameters are stored in a memory that is local to the wireless sensor device. Referring to the example shown in FIG. 1A, for instance, the motion detector device 104 may receive and process the first motion detection signal using the modem 112, and may store the modem parameters at the memory 116. In some implementations, the modem parameters are stored at a memory that is not local to the wireless sensor device. For example, the modem parameters may be sent to a computer system connected to the wireless communication system for storage.

At 406, the stored modem parameters are accessed in the memory, and are applied to the modem of the wireless sensor device. The modem parameters may be applied to one or both of a radio subsystem of the modem or a baseband subsystem of the modem. Referring to the example shown in FIG. 1B, for instance, the modem parameters may be applied to one or more of the baseband chip 111, the radio chip 113, or the RF front end 115 of the modem 112. In some implementations, applying the stored modem parameters includes holding one or more modem parameters of the radio subsystem constant. For example, the modem may hold constant one or more settings dictated by the modem parameters between subsequent transmissions or receptions of motion detection signals. In some implementations, applying the stored modem parameters includes recalling or resetting the stored modem parameters (e.g., after one or more of the modem parameters had been changed between 402 and 406).

At 408, a second motion detection signal is processed by the wireless sensor device using the modem parameters applied at 406. The second motion detection signal may be received by the wireless sensor device at any time. For example, in some implementations, the second motion detection signal is the next signal received by the wireless sensor device after the first motion detection signal. As another example, in implementations where the modem parameters are recalled, the second motion detection signal is not the next signal received by the wireless sensor device after the first motion detection signal. The second motion detection signal may be formatted similar to the first motion detection signal, or formatted in another manner.

At 410, motion is detected using the first and second motion detection signals (and possibly other motion detection signals). Motion may be detected by the wireless sensor device that processed the first and second motion detection signals, or by another computer system (e.g., a server connected to the wireless communication system). In some implementations, the first and second motion detection signals may be compared with one another to determine if motion has occurred in the space. Referring to the example shown in FIGS. 3A-3B, for instance, the received signal R may be analyzed to determine when a change in a complex value $Y_n$ (e.g., a magnitude or phase) for a given frequency component $\omega_n$ occurs, Motion may be detected, for example, when a change in a complex value $Y_n$ for a given frequency component $\omega_n$ exceeds a predefined threshold.

In some implementations, after motion has been detected, an action or programmed response may be taken. For example, a computing device (e.g., the motion detector device 104 of FIG. 1A) may activate a security alert (e.g., send an alert to security personnel, to a homeowners' mobile phone, or to another device), activate lighting or HVAC in the location where motion was detected (e.g., in a room, a hallway, or outdoors), or perform a combination of these or other types of programmed responses.

By using the same parameters to process the first and second motion detection signals as described above, errors (e.g., false positives) may be avoided. For instance, when different modem parameters are applied to the modem of the wireless sensor device and motion detection signals are processed using the different modem parameters, the first and second motion detection signals may be incomparable to the newly processed motion detection signals. For example, a different gain setting may cause the magnitudes of the motion detection signals to be incomparable, such as, for example, by causing a false positive reading of an increased magnitude in a magnitude of a complex value $Y_n$ for a given frequency component $\omega_n$. Thus, in some implementations, where second modem parameters representing a second radio state different from the first radio state are applied to the modem of the wireless sensor device and additional motion detection signals are processed using the second modem parameters, the wireless sensor device uses the additional motion detection signals to detect motion, but does so independently of the first and second motion detection signals.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., non-magnetic drives (e.g., a solid-state drive), magnetic disks, magneto optical disks, or optical disks. However, a computer need not have such devices. Moreover, a computer can be embedded in another device, e.g., a phone, a tablet computer, an electronic appliance, a mobile audio or video player, a game console, a Global Positioning System (GPS) receiver, an Internet-of-Things (IoT) device, a machine-to-machine (M2M) sensor or actuator, or a portable storage device (e.g., a universal serial bus (USB) flash drive). Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a stylus, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. The communication network may include one or more of a local area network ("LAN") and a wide area network ("WAN"), an internetwork (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

In a general aspect of the examples described, motion is detected by processing wireless signals using stored modem parameters.

In a first example, stored modem parameters are accessed from a memory of a wireless sensor device. The stored modem parameters represent a radio state previously used by a radio subsystem of the wireless sensor device in processing a first motion detection signal. The stored modem parameters are applied to the radio subsystem of the wireless sensor device, a second motion detection signal is processed at the wireless sensor device using the radio state represented by the stored modem parameters, and motion is detected based on the first and second motion detection signals.

In a second example, a wireless sensor device includes a modem, a memory, and one or more processors. The modem includes a radio subsystem configured to process signals received by the wireless sensor device, and the memory is configured to store modem parameters representing a radio state used by the radio subsystem in processing a first motion detection signal received by the wireless sensor device. The one or more processors configured to perform operations that include accessing the modem parameters from the memory, applying the modem parameters to the radio subsystem, receiving a second motion detection signal processed by the radio subsystem using the radio state represented by the stored modem parameters, and detecting motion based on the first and second motion detection signals.

Implementations of the first or second example may, in some cases, include one or more of the following features. The modem parameters may include one or more of a gain setting, an RF filter setting, an RF front end switch setting, a DC offset setting, or an IQ compensation setting. Applying the stored modem parameters to the radio subsystem of the wireless sensor device may include holding one or more modem parameters of the radio subsystem constant. The modem parameters may also represent a baseband processing state previously used by a baseband subsystem of the wireless sensor device in processing the first motion detection signal, and the stored modem parameters may be applied to the baseband subsystem of the wireless sensor device. The modem parameters may include one or more of a digital DC correction setting, a digital gain setting, or a digital filtering setting. The modem parameters may be stored in response to receiving the first motion detection signal at the wireless sensor device.

Implementations of the first or second example may, in some cases, include one or more of the following features. The first and second motion detection signals may be based on wireless signals transmitted from a wireless transmitter device to the wireless sensor device. Detecting motion may include detection motion of an object in a space accessed by the wireless signals between the wireless transmitter device and the wireless sensor device. The first motion detection signal may include a packet comprising a header and a payload, and the header may be read to determine that the first motion detection signal has been received at the wireless sensor device.

Implementations of the first or second example may, in some cases, include one or more of the following features. The stored modem parameters may be first modem parameters representing a first radio state. Second modem parameters may be applied to the radio subsystem of the wireless sensor device, with the second modem parameters representing a second, different radio state. Additional motion detection signals may be processed at the wireless sensor device using the second radio state parameters, and motion may be detected based on the additional motion detection signals and independent of the first and second motion detection signals.

In some implementations, a computer-readable medium stores instructions that are operable when executed by a data processing apparatus to perform one or more operations of the first or second example. In some implementations, a system (e.g., a computer system or other type of system communicatively coupled to the wireless sensor device) includes a data processing apparatus and a computer-readable medium storing instructions that are operable when executed by the data processing apparatus to perform one or more operations of the first or second example.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of embodiments have been described. Nevertheless, it will be understood that various modifications can be made. Accordingly, other embodiments are within the scope of the following claims.

What is claimed is:

1. A motion detection method comprising:
    accessing stored modem parameters from a memory of a wireless sensor device, the stored modem parameters representing a radio state previously used by a radio subsystem of the wireless sensor device in processing a first motion detection signal;
    applying the stored modem parameters to the radio subsystem of the wireless sensor device;
    processing a second motion detection signal at the wireless sensor device using the radio state represented by the stored modem parameters; and
    by operation of one or more processors, detecting motion based on the first and second motion detection signals.

2. The method of claim 1, wherein the modem parameters include one or more of a gain setting, an RF filter setting, an RF front end switch setting, a DC offset setting, or an IQ compensation setting.

3. The method of claim 1, wherein applying the stored modem parameters to the radio subsystem of the wireless sensor device comprises holding one or more modem parameters of the radio subsystem constant.

4. The method of claim 1, wherein the modem parameters further represent a baseband processing state previously used by a baseband subsystem of the wireless sensor device in processing the first motion detection signal, and the method comprises applying the stored modem parameters to the baseband subsystem of the wireless sensor device.

5. The method of claim 4, wherein the modem parameters include one or more of a digital DC correction setting, a digital gain setting, or a digital filtering setting.

6. The method of claim 1, comprising storing the modem parameters in response to receiving the first motion detection signal at the wireless sensor device.

7. The method of claim 6, wherein the first motion detection signal comprises a packet comprising a header and a payload, and the method comprises reading the header to determine that the first motion detection signal has been received at the wireless sensor device.

8. The method of claim 1, wherein the stored modem parameters are first modem parameters representing a first radio state, and the method comprises:
    applying second modem parameters to the radio subsystem of the wireless sensor device, the second modem parameters representing a second, different radio state;
    processing additional motion detection signals at the wireless sensor device using the second radio state parameters; and
    detecting motion based on the additional motion detection signals and independent of the first and second motion detection signals.

9. The method of claim 1, wherein the first and second motion detection signals are based on wireless signals transmitted from a wireless transmitter device to the wireless sensor device, and detecting motion comprises detecting motion of an object in a space accessed by the wireless signals between the wireless transmitter device and the wireless sensor device.

10. A wireless sensor device comprising:
    a modem comprising a radio subsystem configured to process signals received by the wireless sensor device;
    a memory configured to store modem parameters representing a radio state used by the radio subsystem in processing a first motion detection signal received by the wireless sensor device;
    one or more processors configured to perform operations comprising:
        accessing the modem parameters from the memory;
        applying the modem parameters to the radio subsystem;
        receiving a second motion detection signal processed by the radio subsystem using the radio state represented by the stored modem parameters; and
        detecting motion based on the first and second motion detection signals.

11. The wireless sensor device of claim 10, wherein the modem parameters include one or more of a gain setting, an RF filter setting, an RF front end switch setting, a DC offset setting, or an IQ compensation setting.

12. The wireless sensor device of claim 10, wherein applying the modem parameters to the radio subsystem comprises holding one or more modem parameters constant.

13. The wireless sensor device of claim 10, wherein the modem further comprises a baseband subsystem, the modem parameters further represent a baseband processing state used by the baseband subsystem in processing the first motion detection signal, and the operations comprise applying the modem parameters to the baseband subsystem.

14. The wireless sensor device of claim 13, wherein the modem parameters include one or more of a digital DC correction setting, a digital gain setting, or a digital filtering setting.

15. The wireless sensor device of claim 10, wherein the operations comprise storing the modem parameters in response to receiving the first motion detection signal at the wireless sensor device.

16. The wireless sensor device of claim 15, wherein the first motion detection signal comprises a packet comprising a header and a payload, and the operations comprise reading the header to determine that the first motion detection signal has been received at the wireless sensor device.

17. The wireless sensor device of claim 10, wherein the modem parameters are first modem parameters representing a first radio state, and the operations comprise:

applying second modem parameters to the radio subsystem, the second modem parameters representing a second, different radio state;

processing additional motion detection signals at the wireless sensor device using the second radio state parameters; and detecting motion based on the additional motion detection signals and independent of the first and second motion detection signals.

18. The wireless sensor device of claim 10, wherein detecting motion comprises detecting motion of an object in a space accessed by the first and second motion detection signals between a wireless transmitter to the wireless sensor device.

19. A non-transitory computer-readable medium storing instructions that are operable when executed by the data processing apparatus to perform operations comprising:

accessing stored modem parameters from a memory of a wireless sensor device, the stored modem parameters representing a radio state previously used by a radio subsystem of the wireless sensor device in processing a first motion detection signal;

applying the stored modem parameters to the radio subsystem of the wireless sensor device;

processing a second motion detection signal at the wireless sensor device using the radio state represented by the stored modem parameters; and detecting motion based on the first and second motion detection signals.

20. The computer-readable medium of claim 19, wherein the modem parameters further represent a baseband processing state previously used by a baseband subsystem of the wireless sensor device in processing the first motion detection signal, and the operations comprise applying the stored modem parameters to the baseband subsystem of the wireless sensor device.

* * * * *